United States Patent [19]
Tamura et al.

[11] 3,953,069
[45] Apr. 27, 1976

[54] VEHICLE SEAT BACK TILT CONTROL MECHANISM

[75] Inventors: Takeo Tamura, Tokyo; Hideo Ishida, Kozai, both of Japan

[73] Assignees: Nissan Motor Company Limited, Yokohama; Fuji Kiko Company Limited, Tokyo, both of Japan

[22] Filed: Apr. 15, 1975

[21] Appl. No.: 568,202

Related U.S. Application Data

[63] Continuation of Ser. No. 409,148, Oct. 24, 1973, abandoned.

[30] Foreign Application Priority Data

Oct. 25, 1972 Japan.............................. 47-107428
Mar. 16, 1973 Japan.............................. 48-31112

[52] U.S. Cl................................ 297/367; 16/146; 297/379
[51] Int. Cl.².............................................. B60N 1/02
[58] Field of Search.................. 297/362, 364–367, 297/379, 353, 354, 355, 370; 16/146

[56] References Cited
UNITED STATES PATENTS

| 2,784,770 | 3/1957 | Herr.................................. 297/367 |
| 3,299,466 | 1/1967 | Werner........................... 297/366 X |
| 3,471,892 | 10/1969 | Resag et al. ...................... 297/366 X |
| 3,727,978 | 4/1973 | Barriere et al................... 297/379 X |
| 3,866,270 | 2/1975 | Suzuki et al. ..................... 297/379 X |

Primary Examiner—Roy D. Frazier
Assistant Examiner—William E. Lyddane

[57] ABSTRACT

A seat back tilts forward when an actuating lever is pulled, and remains forward after the lever is released. The seat back is restored to a desired operating position by pushing it backward until it stops moving. The desired position is set by pulling a release lever, pushing the seat back to the desired position, and releasing the release lever.

15 Claims, 9 Drawing Figures

VEHICLE SEAT BACK TILT CONTROL MECHANISM

This is a Continuation, of application Ser. No. 409,148, Filed Oct. 24, 1973, now abandoned.

This invention relates to an adjustable seat for a motor vehicle, and more particularly to a tilt control mechanism by which the seat back can be tilted and locked in a desired angular position. The control mechanism proposed by the present invention is specifically suited for use with a front seat of a two-door motor vehicle.

A conventional adjustable seat used in a known motor vehicle is usually arranged to tilt forward to provide access to a rear seat and to enable a vehicle occupant using the rear seat to enter or leave through the front door opening. This seat commonly employs a mechanism by which the seat back may be tilted in various ways depending upon the stature of the vehicle occupant. The device includes a latch to lock the seat back in a desired angular position and a release lever to release the seat back for forward tilting movement.

It is therefore an object of the present invention to provide a tilt control mechanism for a vehicle seat back having a mechanical memory by which the seat back can be readily locked in a set position which is optimum for the vehicle occupant.

This and other objects and advantages of the present invention will become more apparent from the following description taken in conjunction with the accompanying drawings, in which;

Figure 1:
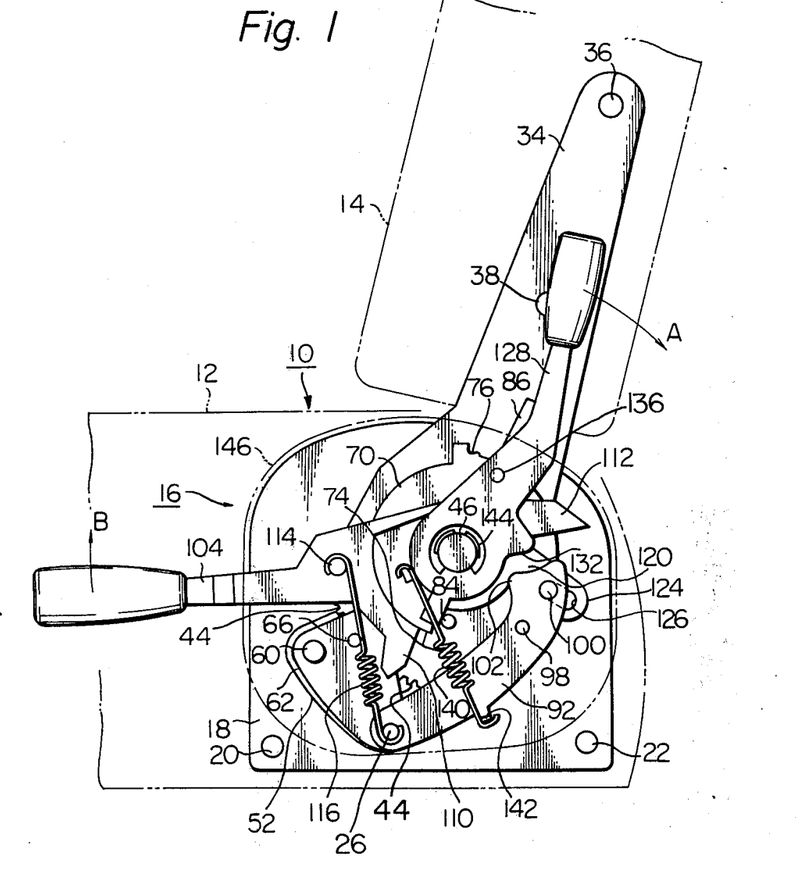
FIG. 1 is a side view of a seat of a motor vehicle incorporating an embodiment of a tilt control mechanism according to the present invention.
Figure 2:
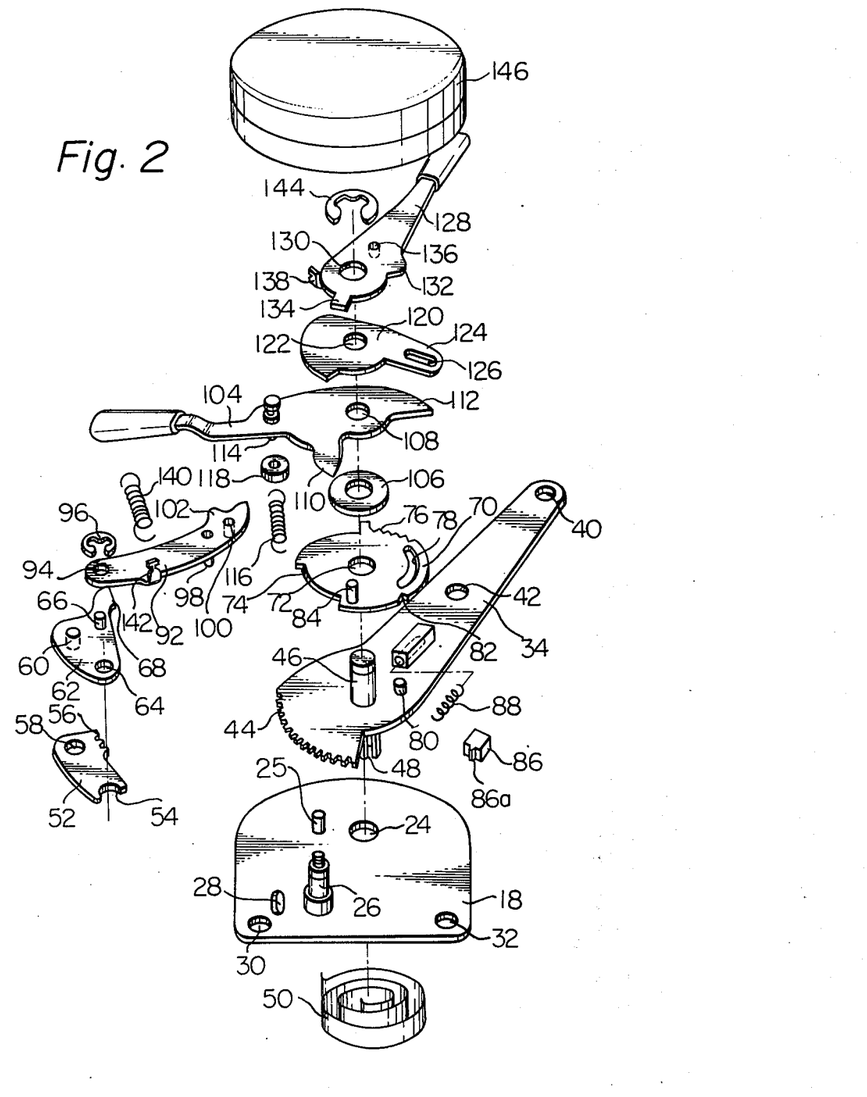
FIG. 2 is an exploded view of the control mechanism shown in FIG. 1.
Figure 3:
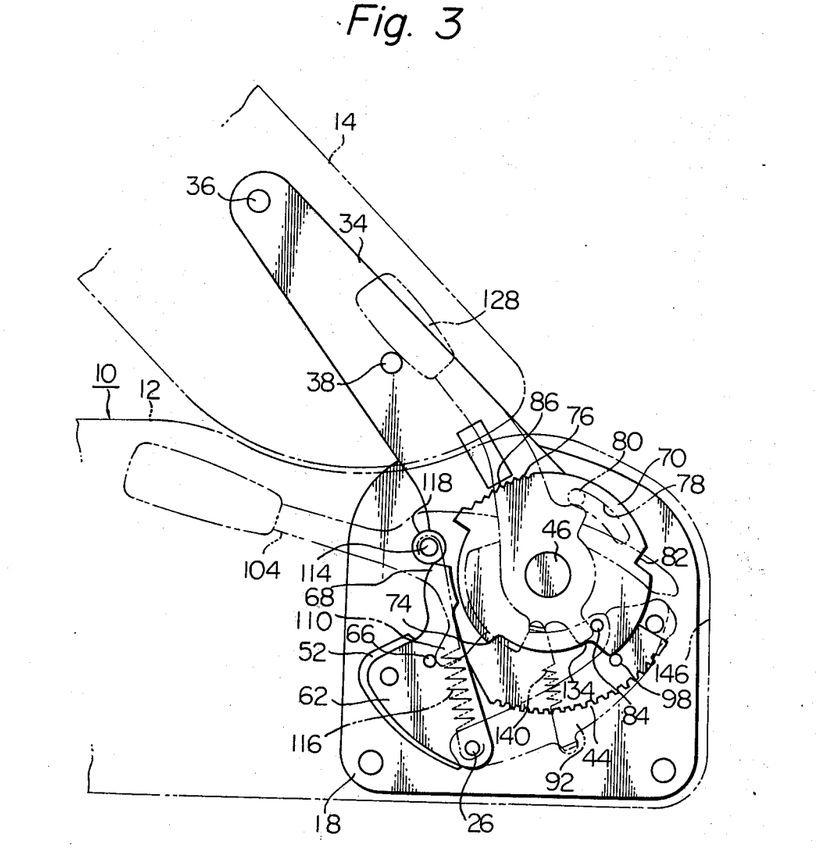
FIG. 3 is a view similar to FIG. 1 but shows the seat back as tilted forward.

Referring now to the drawings and more particularly to FIGS. 1 to 3, there is shown a preferred embodiment of a tilt control mechanism according to the present invention which is particularly useful for a seat back of a motor vehicle. A seat 10 has a seat cushion 12 and a seat back 14 which can be tilted forward or locked in a desired angular position by a control mechanism embodying the present invention.

The control mechanism, generally indicated as 16, comprises a base plate 18 which is fixed to a side face of the seat cushion 12 by a suitable fastening means such as bolts 20 and 22. As best shown in FIG. 2, the base plate 18 has a hole 24 formed therethrough. A stub shaft 26 is fixedly connected to the base plate 18 at a location spaced from the center of the hole 24. The base plate 18 also has an elongated guide slot 28, which will be subsequently described in detail in connection with other parts of the device. The base plate 18 further has through its lower end holes 30 and 32, through which the bolts 20 and 22 extend toward the side face of the seat cushion 12 (see FIG. 1).

The control mechanism 16 further comprises a control arm 34 a first hinge member, which is fixedly connected to the side face of the seat back 14 by a suitable fastening means such as bolts 36 and 38 extending through holes 40 and 42, respectively, formed through the control arm 34. As best shown in FIG. 2, the control arm 34 is formed with a plurality of teeth 44 at its lower end thereof, and is fixedly mounted on a rotatable shaft 46. The rotatable shaft 46 is rotatably disposed in the hole 24 of the base plate 18 and has an axially extending slit 48 at a lower end thereof, in which one end of a coil spring 50 fits. The coil spring 50 is located between the base plate 18 and the side face of the seat cushion 12 and has the other end connected a fixed pin 25 extending downward from the base plate 18 for biasing the rotatable shaft 46 and accordingly the control arm 34 in a direction to tilt the seat back 14 forward.

A dog plate 52 is pivotally mounted on the base plate 18 in the same plane as the control arm 34. The dog plate 52 has formed through one end a semicircular hole 54 through which the stub shaft 26 extends so that the dog plate 52 is rotatable thereabout. The dog plate 52 is formed with a plurality of teeth 56 which engage with the adjacent teeth 44 of the control arm 34. Thus, it is to be noted that the dog plate 52 and the teeth 44 of the control arm 34 act as lock means for locking the control arm 34 when they are steadily engaged to each other. The dog plate 52 also has a hole 58 formed through one end thereof, through which a fixed guide pin 60 extending downward from an actuating plate or actuating means 62 is tightly fitted so that the dog plate 52 is fixed to the actuating plate 62 and movable therewith.

The actuating plate 62 has a hole 64 formed through one end for receiving therethrough the stub shaft 26 so that the actuating plate 62 is pivotable thereabout. It should be noted that rotation of the actuating plate 62 is limited by the guide slot 28 of the base plate 18 through which the fixed pin 60 extends from the actuating plate 62. The actuating plate 62 has a fixed pin 66 which extends upward from a location spaced from the hole 64 and the fixed guide pin 60. A cam projection 68 or a cam portion is formed on the actuating plate 62 such that it projects laterally from the upper end of the plate 62. The actuating plate 62 is disposed above an end portion of the control arm 34, above which a lock plate 70 or a circular memory plate is also disposed in the same plane as the actuating plate 62.

The lock plate 70 has a hole 72 formed through its central portion through which the rotatable shaft 46 extends upward so that the lock plate 70 is rotatable thereabout. The lock plate 70 has formed on its circumferential periphery an arcuate cam surface 74 or an arcuate pin, with which the cam projection 68 of the actuating plate 62 engages. A plurality of teeth 76 is also formed on the circumference of the lock plate 70 at a location spaced from the cam surface 74. These teeth 76 are utilized for angular adjustment of the seat back with respect to the seat cushion as will be subsequently described. The lock plate 70 is also formed with an arcuate guide slot 78 or an arcuate slot, into which a fixed pin 80 extends upward from the control arm 34. The arcuate guide slot 78 is sized to limit rotation of the lock plate 70. A notch 82 is formed on the circumference of the lock plate 70 between the cam surface 74 and the teeth 76 and serves to lock the lock plate 70 in a manner as will be described hereinafter. An upwardly extending fixed stop pin 84 is provided on the lock plate 70 and serves in a manner as will be subsequently described.

To effect locking of the control arm 34 and accordingly the seat back 14 at a desired angular position, a dog member 86 is radially movably disposed on the control arm 34. The dog member 86 is biased toward the teeth 76 of the lock plate 70 to engage therewith by a compression spring 88 partly disposed in a spring retainer 90 secured on the control arm 34. The dog member 86 has a tooth 86a engageable with a selected tooth 76 of the lock plate 70 by which the seat back 14 is locked at a desired angular position as previously mentioned. Therefore, the actuating plate 62, the lock plate 70 and the dog member 86 form a memorizing means for memorizing an angular position of the control arm 34 with respect to the lock plate 70. It should be noted that the dog member 86 may be guided by a suitable guide means so as to move in a radial direction. It should also be noted that the teeth 76 of the lock plate 70 and the dog member 86 constitute a locking means, and that the teeth 56 and 44 of the dog plate 52 and control arm 34 respectively constitute a means for locking the control arm 34.

In order to hold the lock plate 70 stationary with respect to the base plate 18, an arcuate stop plate 92 is disposed over the lock plate 70. The stop plate 92 has a hole 94 formed through one end thereof through which the stub shaft 26 extends so that the stop plate 92 is rotatable about the shaft 26. The stop plate 92 is retained on the stub shaft 26 by a snap ring 96 fitted in an annular groove of the stub shaft 26. As shown, the stop plate 92 has a downwardly extending stop pin 98 which is engageable with the notch 82 of the lock plate 70 to lock the same. The stop pin 98 and notch 82 thus constitute memory change means for locking the lock plate 70. The stop plate 92 also has a downwardly extending fixed pin 100, which will be subsequently described in detail. Indicated as 102 is a cam projection which projects from the stop plate 92.

A means for rotating the actuating plate 62 comprises a release lever 104 disposed over the lock plate 70 on a washer 106. The release lever 104 has a hole 108 which receives therethrough the rotatable shaft 46, about which the release lever 104 is rotatable. As shown, the release lever 104 has perpendicularly spaced projections 110 or a first projection and 112 or a second projection. The projection 110 is engageable with the fixed pin 66 of the actuating plate 62 when the release lever 104 is rotated clockwise so that the actuating plate 62 is rotated counter-clockwise. When this takes place, the cam projection 68 of the actuating plate 62 disengages from the cam surface 74 of the lock plate 70 while the lock plate 70 is held stationary by the pin 98 engaging with the notch 82 of the lock plate 70. At the same time, the dog plate 52 fixed to the actuating plate 62 is rotated counter-clockwise so that the teeth 56 thereof move out of engagement with the teeth 44 of the control arm 34. Thus, the control arm 34 is biased forward by the coiled spring 50. The projection 112 is intended to abut against the fixed pin 100 downwardly extending from the stop plate 92 thereby limiting further clockwise rotation of the release lever 104.

As shown, the release lever 104 has a roller shaft 114 having one end extending upward from the release lever 104 and the other end extending downward from the lever 104. The top end of the roller shaft 114 supports one end of a first tension return spring 116 which has its other end hooked over the stub shaft 26 thereby biasing the release lever 104 counter-clockwise. The roller shaft 114 carries about its bottom end a press roller 118, which is pressed against a side edge of the cam projection 68 of the actuating plate 62 by the tension spring 116 acting on the release lever 104. Thus, the cam projection 68 is held in contact with the cam surface 74 of the lock plate 70.

To limit excessive clockwise rotation of the stop plate 92, a guide plate 120 is disposed over the release lever 104. The guide plate 120 has a hole 122, through which the rotatable shaft 46 extends and about which the guide plate 120 is rotatable. This guide plate 120 has a laterally extending projection 124 which is located between the step plate 92 and the release lever 104, and through which an elongated radially extending guide slot 126 is formed. The guide slot 126 receives therethrough the guide pin 100 downwardly extending from the stop plate 92. This guide slot 126 is of such a length as to permit clockwise rotation of the stop plate 92 over a limited angular range to allow the fixed stop pin 98 to be released from the notch 82 of the lock plate 70. Thus, the guide pin 100 and the guide slot 126 constitutes limit means for limiting the rotational extent of the stop plate 92.

An actuating lever 128 is provided which has a hole 130 through which the rotatable shaft 46 extends. The actuating lever 128 is disposed above the guide plate 120 and is rotatable about the shaft 46. As shown, the actuating lever 128 is formed with a laterally extending cam projection 132 serving as a means for rotating the stop plate 92, and a laterally extending tab 134 serving as a stop. The cam projection 132 is engageable with the adjacent cam projection 102 of the stop plate 92 when the actuating lever 128 is rotated clockwise. The laterally extending tab 134 abuts against the stop pin 84 upwardly extending from the lock plate 70 thereby preventing excessive rotation of the actuating lever 128 in a counter-clockwise direction when the lever 128 is in its rest position shown in FIG. 1.

A fixed pin 136 is provided which extends downward from the actuating lever 128 and which constitutes a means engageable with the side edge of the projection 112 of the release lever 104 when the actuating lever 128 is rotated clockwise, whereby when the actuating lever 128 is further rotated in the same direction, the release lever 104 is caused to rotate in the same direction. The actuating lever 128 also has an upwardly extending tab 138 which is formed in a notch (not numbered). The notch of the tab 138 receives one end of a second tension return spring 140, which has its other end hooked over a notch of an upwardly extending tab 142 of the stop plate 92.

It will thus be noted that the stop plate 92 and the actuating lever 128 are biased in a counter-clockwise direction as shown in FIG. 1 by the return spring 140. In this situation, the laterally extending tab 134 of the actuating lever 128 is held in abutting engagement with the stop pin 84 of the lock plate 70, while the fixed pin 136 of the actuating lever 128 is held out of abutting engagement with the side edge of the projection 112 of the release lever 104. A snap ring 144 is disposed in an annular groove formed on the rotatable shaft 46 to prevent axial displacement of the lock plate 70, the washer 106, the release lever 104, the guide plate 120 and the actuating lever 128. Indicated as 146 is a covering to prevent entry of dust into the mechanism.

With the configuration described hereinabove, if the actuating lever 128 is rotated in a direction shown by an arrow A in FIG. 1 against the force of the return spring 140, the cam projection 132 of the actuating lever 128 is brought into abutting engagement with the corresponding cam projection 102 of the stop plate 92. In this condition, the stop plate 92 is forced to rotate in the same direction, clockwise, and the stop pin 98 of the stop plate 92 is moved out of engagement with the notch 82 of the lock plate 70 whereby the lock plate 70 is unlocked. Also, the stop pin 136 of the actuating lever 128 is brought into contact with the side edge of the projection 112 of the release lever 104 upon rotation of the actuating lever 128, thereby rotating the release lever 104 in a direction shown by B in FIG. 1, also clockwise. This causes the projection 110 of the release lever 104 to abut against the fixed pin 66 of the actuating plate 62 so that the actuating plate 62 is rotated counter-clockwise about the stub shaft 26. Since the dog plate 52 is fixed to the actuating plate 62, the dog plate 52 is rotated in the same direction as the actuating plate 62, and the teeth 56 of the dog plate 52 disengages from the corresponding teeth 44 of the control arm 34. Therefore, the control arm 34 and accordingly the seat back 14 fixed thereto are tilted forward by the force of coil spring 50 having one end retained by the axial slit 48 of the rotatable shaft 46. In this situation, the teeth 56 of the dog plate 52 are held out of engagement with the adjacent teeth 44 of the control arm 34 while the cam projection 68 is held in contact with the circumferential periphery of the lock plate 70, whereas the seat back 14 is held in its tilted position.

If, on the contrary, the rotational force exerted on the actuating lever 128 is released, then it is rotated counter-clockwise by the force of the return spring 140 until the tab 134 abuts against the stop pin 84 of the lock plate 70 (see FIG. 3). In this situation, if the seat back 14 is tilted backward toward an upright position, the control arm 34 and the lock plate 70 rotate clockwise simultaneously until the stop pin 98 of the stop plate 92 is brought into engagement with the notch 82 of the lock plate 70, and the cam projection 68 of the actuating plate 62 is simultaneously brought into engagement with the cam surface 74 of the lock plate 70. Under these circumstances, the release lever 104 is rotated by the spring 116 counter-clockwise toward its original position, and the press roller 118 is brought into abutting engagement with the left edge of the cam projection 68 of the actuating plate 62. This causes the actuating plate 62 and the dog plate 52 to rotate clockwise so that the teeth 56 of the dog plate 52 are brought into engagement with the teeth 44 of the control arm 34. Thus, the seat back 14 is tilted backward and locked in its desired angular position which is optimum for the vehicle occupant.

If, furthermore, the release lever 104 is rotated in a direction shown by an arrow B when the seat back 14 is locked in the upright position as shown in FIG. 1, the actuating plate 62 is rotated counter-clockwise in a manner as previously noted. In this condition, the teeth 56 of the dog plate 52 integral with the actuating plate 62 disengage from the teeth 44 of the control arm 34, so that the control arm 34 is rotatable against the force of the spring 88 biasing engagement of the tooth 86a with a tooth 76 with respect to the lock plate 70 within a range provided by the arcuate guide slot 78 of the lock plate 70. It should be understood in this instance that the lock plate 70 is held stationary because of the stop pin 98 of the stop plate 92 engaging with the notch 82 of the lock plate 70. The holding force of the pin 98 in the notch 82 is greater than that of the tooth 86a in the teeth 76, so that the arm 34 can rotate relative to the plate 70, and the seat back 14 can be pushed to the desired angular position at which the tooth 86a will engage at the proper position in the teeth 76. The release lever 104 is released and the seat back 14 is locked in the desired tilted position. It should be noted that since the desired angular position of the control arm 34 and accordingly the seat back 14 are effectively memorized by the locking means comprising the teeth 76 and 86a, if the seat back 14 is pushed backward from its forward tilted position, it will stop moving at the desired angular position.

Figure 9:
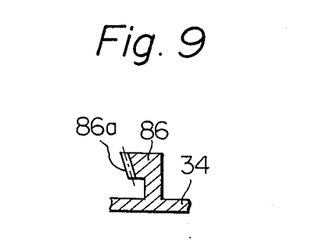
FIG. 9 is an enlarged fragmentary sectional view taken on a line IX—IX of FIG. 8.

A modified form of a control mechanism according to the present invention is illustrated in FIGS. 4 to 7, in which like or corresponding component parts are designated by the same reference numerals as those used in FIGS. 1 to 3. This illustrated embodiment is similar to that of FIGS. 1 to 3, and a detailed description is herein omitted except for the parts which are modified in construction. In the illustrated embodiment of FIGS. 4 to 7, the locking means comprises the dog member 86 which is fixedly mounted on the control arm 34, and the lock plate 70 is disposed over the control arm 34 by means of a compression spring 150, so that upon axial depression of the lock plate 70, the tooth 86a of the dog member 86 disengages from the teeth 76 of the lock plate 70. As best shown in FIG. 9, the tooth 86a of the dog member 86 is inwardly beveled and the teeth 76 (FIG. 6) of the lock plate 70 are outwardly beveled.

Figure 4:
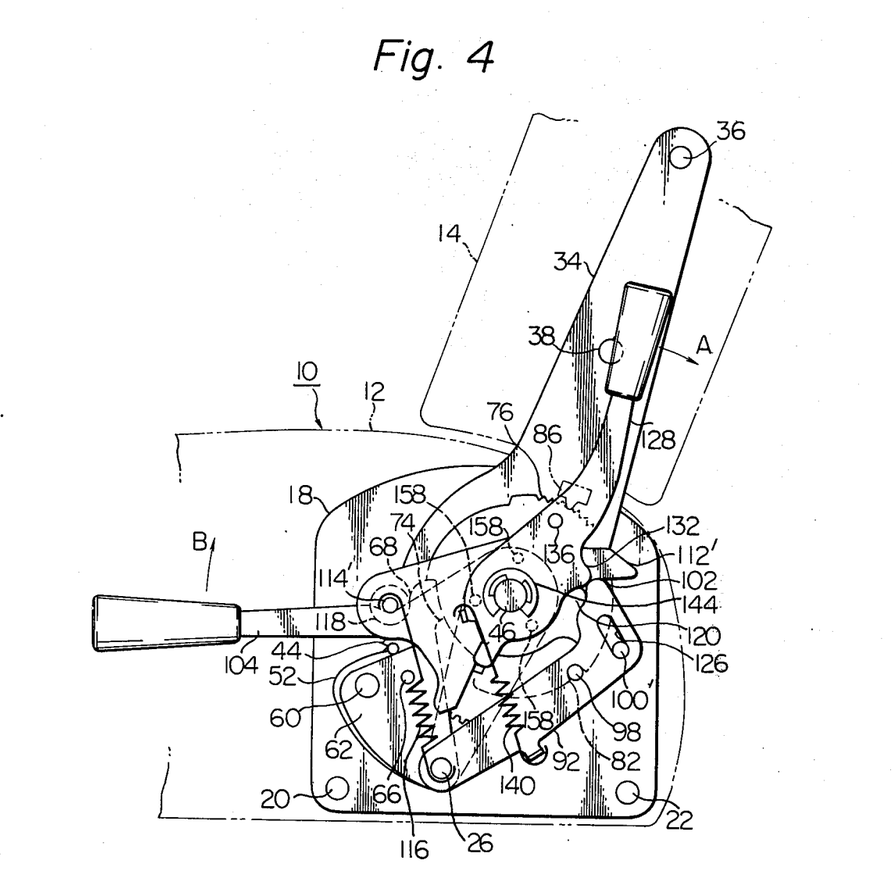
FIG. 4 is a view similar to FIG. 1 but shows another preferred embodiment of a tilt control mechanism according to the present invention.
Figure 5:
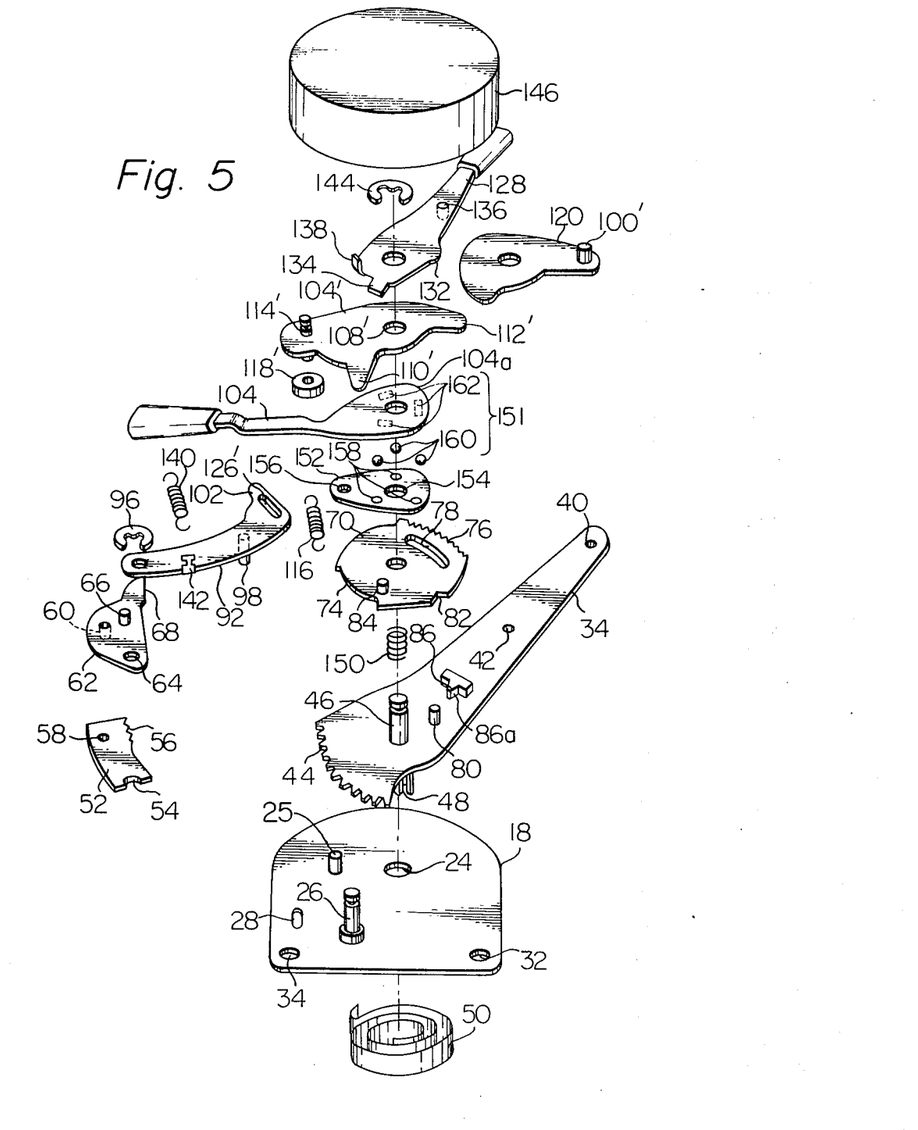
FIG. 5 is an exploded view of the control mechanism shown in FIG. 4.

To control the axial movement of the lock plate 70 with respect to the control arm 34, a biasing means 151 is provided. The biasing means 151 comprises a retaining plate 152 which has a hole 154 through which the rotatable shaft 46 extends. The retaining plate 152 also has a hole 156 through which the stub shaft 26 extends, by which the retaining plate 152 is axially movably supported. As shown, the retaining plate 152 is further formed at angularly equally spaced positions with a plurality of blind holes 158, which receive a plurality of balls 160 forming part of the biasing means 151. Upper portions of the balls 160 are held in contact with a plurality of elongated blind holes 162 formed on a biasing plate 104a integrally formed with the release lever 104 at positions corresponding to those of the blind holes 158. Each of the elongated blind holes 162 has an inclinded bottom surface, by which when the release lever 104 is rotated in one direction, for example, clockwise, the retaining plate 152 is pressed downward toward the lock plate 70 by means of the plurality of balls 160 so that the locking means is unlocked. It should now be understood that in the illustrated embodiment of FIGS. 4 to 7, the washer 106 is replaced by the retaining plate 152. In this modified form of the control mechanism, an auxiliary release member 104' is separately formed from the release lever 104. The auxiliary release member 104' has a hole 108' through which the rotatable shaft 46 extends so that the auxiliary release member 104 is rotatable thereabout. This release member 104' has perpendicularly arranged laterally extending projections 110' and 112' as formed on the release lever 104 of the first embodiment. The projection 110' is arranged to abut against the fixed pin 66 of the actuating plate 62, while the projection 112' abuts against the fixed pin 136 of the actuating lever 128 when the actuating lever 128 is rotated clockwise. The auxiliary release member 104' also has a roller shaft 114' on which a press roller 118' is rotatably mounted. As previously stated in conjunction with the first embodiment, the press roller 118' is arranged to engage with the side edge of the cam projection 68 of the actuating plate 62 thereby pressing the same against the lock plate 70. As already noted hereinabove, the auxiliary release member 104' rotates clockwise with rotation of the release lever 104. To this end, the release lever 104 is engageable at its top edge as shown in FIG. 4 with the roller shaft 114' between the auxiliary release member 104' and the press roller 118'. In the modified form of FIGS. 4 to 7, moreover, the guide plate 120 is shown as having a fixed pin 100 which extends upwardly as viewed in FIG. 5, whereas the stop plate 92 is shown as having an elongated guide slot 126' through which the fixed pin 100' of the guide plate 120 extends for limiting excessive rotation of the stop plate 92. It should also be noted that the spring 116 is provided between the roller shaft 114' of the auxiliary release member 104' and the stub shaft 26, and therefore the auxiliary member 104' is biased counter-clockwise, whereas in the embodiment of FIGS. 1 to 3, the release lever 104 is biased counter-clockwise by the force of the spring 116.

If, in operation, the actuating lever 128 is rotated in a direction shown by an arrow A in FIG. 4, then the cam portion 132 of the actuating lever 128 is brought into abutting engagement with the adjacent cam projection 102 of the stop plate 92, thereby rotating the stop plate 92 in the same direction. Upon clockwise rotation of the stop plate 92, the stop pin 98 extending therefrom is moved out of engagement with the notch 82 of the lock plate 70, and accordingly, the lock plate 70 is unlocked. In the meantime, the stop pin 136 of the actuating lever 128 is brought into contact with the projection 112' of the auxiliary release member 104' thereby rotating the member 104' in the same direction as the actuating lever 128. This causes the projection 110' of the auxiliary release member 104' to abut against the stop pin 66 of the actuating plate 62 so that the acutating plate 62 is rotated counter-clockwise about the stub shaft 26. Consequently, the teeth 56 of the dog plate 52 fixedly mounted on the actuating plate 62 disengage from the teeth 44 of the control arm 34. Therefore, the control arm 34 and accordingly the seat back 14 are automatically tilted forward by the force of the coil spring 50 having its one end retained by the axially extending slit 48 of the rotatable shaft 46. In this situation, the teeth 56 of the dog plate 52 are held out of engagement with the teeth 44 of the control arm 34, while the cam projection 68 of the actuating plate 62 is held in engagement with the circumferential periphery of the lock plate 70, whereas the seat back 14 is held in its tilted position.

Figures 6, 7:
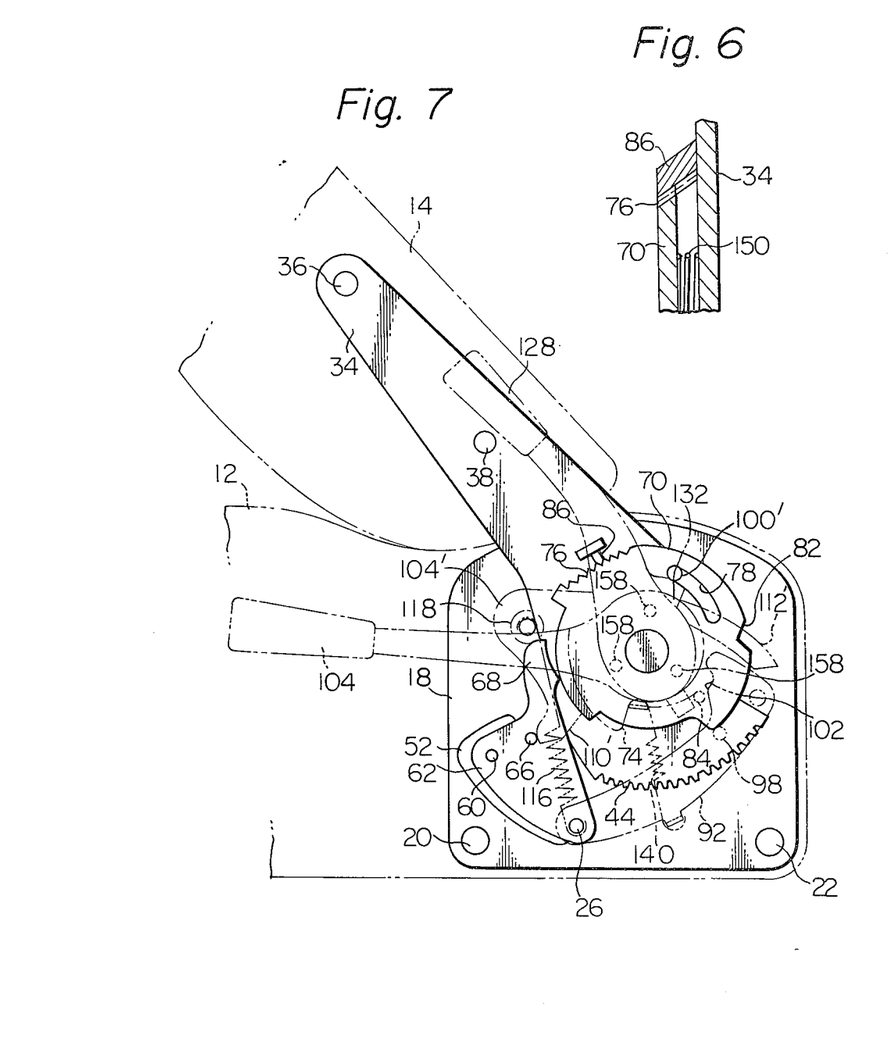
FIG. 6 is an enlarged fragmentary sectional view taken on line VI—VI of FIG. 4.
FIG. 7 is a view similar to FIG. 4 but shows the seat back as tilted forward.

If, on the contrary, the actuating lever 128 is released, then it is rotated counter-clockwise by the action of the spring 140 until the tab 134 engages with the stop pin 84. (FIGS. 4 and 7). If, in this condition, the seat back 14 is tilted backward, or toward its upright position, the control arm 34 and the lock plate 70 rotate clockwise simultaneously because of engagement of the locking means until the stop pin 98 of the stop plate 92 engages in the notch 82 of the lock plate 70. Simultaneously, the cam projection 68 of the actuating arm 62 is brought into contact with the cam surface 74 of the lock plate 70. Consequently, the auxiliary release member 104' is rotated counter-clockwise by the force of the return spring 116 toward its original position, and the press roller 118' is brought into abutting engagement with the left side edge of the cam projection 68 of the actuating place 62. This causes the actuating plate 62 and accordingly the dog plate 52 to rotate clockwise so that the teeth 56 of the dog plate 52 engage with the teeth 44 of the control arm 34. Thus, the seat back 14 is locked in its desired angular position which is optimum for the vehicle occupant.

If, furthermore, the release lever 104 is rotated in a direction shown by an arrow B in FIG. 4 when the seat back 14 is locked in its upright position, the release lever 104 abuts at its upper edge against the roller shaft 114' between the guide roller 118' and the auxiliary release member 104', thereby rotating the auxiliary release member 104' in the same direction as the release lever 104. In this instance, the projection 110' of the auxiliary release member 104' abuts against the stop pin 66 of the actuating plate 62 so that the teeth 56 of the dog plate 52 are moved out of engagement with the teeth 44 of the control arm 34 in a manner as previously stated. It should be appreciated in this instance that the lock plate 70 is locked or held stationary by the action of the stop pin 98 engaging with the notch 82 of the lock plate 70. Upon clockwise rotation of the release lever 104, the retaining plate 152 of the biasing means 151 is pressed downward against the force of the compression spring 150 by the plurality of balls 160 disposed between the biasing plate 104a and the retaining plate 152, and the locking means is unlocked. This the control arm 34 is rotatable in either direction within a range provided by the arcuate guide slot 78 of the lock plate 70 through which the stop pin 80 of the control arm 34 extends. Consequently, if the rotational force of the release lever 104 is withdrawn at a new desired angular position of the control arm 34 and seat back 14, the auxiliary release member 104' and accordingly the release lever 104 are rotated counter-clockwise to their original positions by the force of the spring 116. In this condition, the actuating plate 62 is rotated clockwise by the force of the press roller 118' contacting the side edge of the cam projection 68 of the actuating plate 62, and the cam projection 68 is consequently brought into contact with the cam surface 74 of the lock plate 70. At the same time, the teeth 56 of the dog plate 52 are brought into engagement with the teeth 44 of the control arm 34, and the seat back 14 is locked in a new tilted position. It should be understood in this situation that upon release of the release lever 104, the retaining plate 152 and the lock plate 70 are axially moved upward by the force of the compression spring 150, and a new tooth 76 of the lock plate 70 engages with the tooth 86a of the dog member 86 whereby a newly selected desired angular position of the seat back 14 is memorized. Thus, the seat back 14 can be readily restored to its desired angular position when the seat back 14 is tilted forward and thereafter tilted backward.

Figure 8:
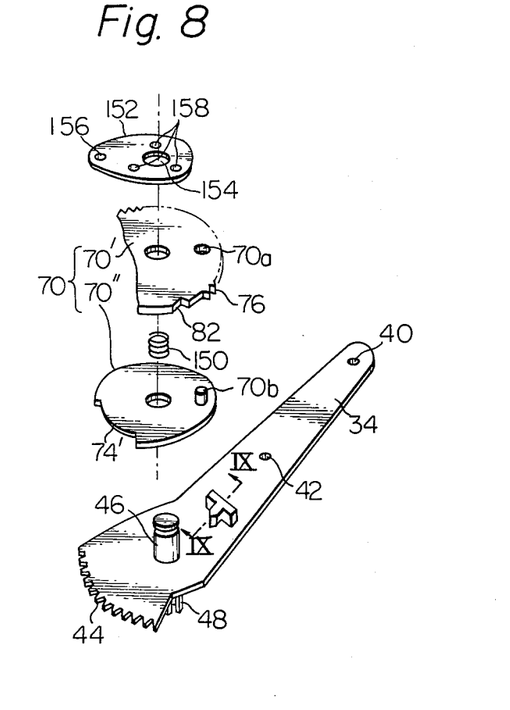
FIG. 8 is a partial exploded view illustrating a modified form of the mechanism shown in FIGS. 4, 5, 6 and 7.

As shown in FIGS. 8 and 9, the lock plate 70 may be constituted by first and second disc elements 70' and 70", between which the compression spring 150 is disposed. The first disc element 70' has the notch 82 and the teeth 76 formed on the circumferential periphery thereof. The second disc element 70" has the cam surface 74 and a fixed pin 70b, which extends through a hole 70a of the first disc element 70'. It should be noted that the teeth 76 are beveled (see FIG. 6) whereas the tooth 86a of the dog member 86 is also beveled as shown in FIG. 9.

It should now be understood from the foregoing description that a control mechanism of the present invention has a memory means comprising the locking means by which the seat back can be tilted to its original angular position optimum for the vehicle occupant.

It should also be noted that a control mechanism of the present invention can be readily installed in an existing front seat of a motor vehicle without requiring any significant changes or modifications.

What is claimed is:

1. A tilt control mechanism for a vehicle seat having a seat cushion and a seat back tiltable about an axis, which comprises;
    a first hinge member mounted on the side portion of said seat back;
    a second hinge member mounted on the side portion of said seat cushion and hinged on said first hinge member by a rotatable shaft;
    lock means locking said first hinge member at a selected angular position relative to said second hinge member when actuated and allowing said first hinge member to rotate when unlocked;
    actuating means connected to said lock means and actuating said lock means;
    said lock means including a dog plate pivotally mounted on a stub shaft securely fixed on said second hinge member, said dog plate having thereon a toothed portion, a toothed end portion of said first hinge member being engageable with the toothed portion of said dog plate;
    memorizing means including
    a generally circular memory plate coaxially disposed on said rotatable shaft and having on one peripheral portion thereof an arcuate gain for receiving said cam portion so as to cause said actuating plate to move said dog plate into engagement with said toothed end portion of said first hinge member thereby causing said first hinge member to be locked and having on another peripheral portion thereof a toothed portion, a dog member movably disposed on said first hinge member, said dog member being selectively engageable with the toothed portion of said circular memory plate;
    memory change means allowing said memorizing means to change the memorized angular position thereof when actuated;
    a release lever being rotatable about said axis and having means connectable with said actuating means, for releasing said actuating means when rotated; and
    an actuating lever being rotatable about said axis for rotating said release lever and actuating said memory change means when it is manually rotated.

2. A tilt control mechanism as claimed in claim 1, in which said actuating means includes an actuating plate pivotally mounted on said stub shaft and connected to said dog plate and having a cam portion.

3. A tilt control mechanism as claimed in claim 1, in which said circular memory plate is formed with an arcuate slot engageable with a fixed pin mounted on said first hinge member, whereby the rotation extent of said lock plate is limited.

4. A tilt control mechanism as claimed in claim 3, in which said memory change means includes:
    a stop plate pivotally mounted on said stub shaft and having a stop pin,
    a notched portion formed in a peripheral portion of said circular memory plate and being engageable with said stop pin to lock said circular memory plate.

5. A tilt control mechanism as claimed in claim 4, in which said release lever is coaxially disposed on said shaft and positioned at the opposite side of said control arm with respect to said generally circular memory plate and has a first projection engageable with a pin extending from said actuating plate and has a second projection.

6. A tilt control mechanism as claimed in claim 5, in which said actuating lever is coaxially disposed on said shaft and positioned at the opposite side of said generally circular memory plate with respect to said release lever and has a projection engageable with a projection projecting from said stop plate and a fixed pin mounted thereon engageable with said second projection.

7. A tilt control mechanism as claimed in claim 1, further comprising limit means limiting the rotation extent of said stop plate.

8. A tilt control mechanism as claimed in claim 2, further comprising a press roller rotatably supported by a roller shaft mounted on said release lever, said press roller being biased to engage with said cam portion formed on said actuating plate by a biasing means.

9. A tilt control mechanism as claimed in claim 3, in which said circular memory plate is axially movable, and in which the toothed portion of said circular memory plate is inclined and said dog member has an inclined toothed portion engageable with the toothed portion of said circular memory plate.

10. A tilt control mechanism as claimed in claim 9, further comprising a spring member coaxially disposed on said first hinge member for biasing said circular memory plate in a direction to effect engagement with said dog member.

11. A tilt control mechanism as claimed in claim 10, further comprising a biasing means superimposed on said circular memory plate for moving said circular memory plate in a direction to effect disengagement with said dog member.

12. A tilt control mechanism as claimed in claim 11, in which said biasing means includes:
    a retaining plate coaxially disposed on said shaft and positioned at the opposite side of said control arm with respect to said generally circular memory plate and having a plurality of blind holes thereon,
    a plurality of balls retained in said blind holes of said retaining plate, and
    a biasing plate integrally formed with said release lever, said biasing plate having thereon a plurality of elongated blind holes which receive said plurality of balls respectively, each of said elongated blind holes having an inclined bottom surface, whereby when said release lever is rotated, said retaining plate is axially moved toward said circular memory plate thereby to move the same toward said first hinge member to effect disengagement with said dog member.

13. A tilt control mechanism as claimed in claim 12, in which said release lever has an auxiliary release member separately formed therefrom and coaxially disposed on said shaft and positioned between said release lever and said actuating lever.

14. A tilt control mechanism as claimed in claim 13, in which said auxiliary release member has a first projection engageable with a pin extending from said actuating plate.

15. A tilt control mechanism as claimed in claim 14, further comprising a press roller rotatably supported on a roller shaft provided on said auxiliary release member, said press roller being biased to engage with a cam projection of said plate.

* * * * *